Dec. 9, 1952 H. M. MAUTNER ET AL 2,620,635
COOLING SYSTEM AND CONTROL
Filed Sept. 9, 1950 4 Sheets-Sheet 1

Inventors:
Henry M. Mautner
Alex J. Weiss
By Bair, Freeman & Molinare
Attys.

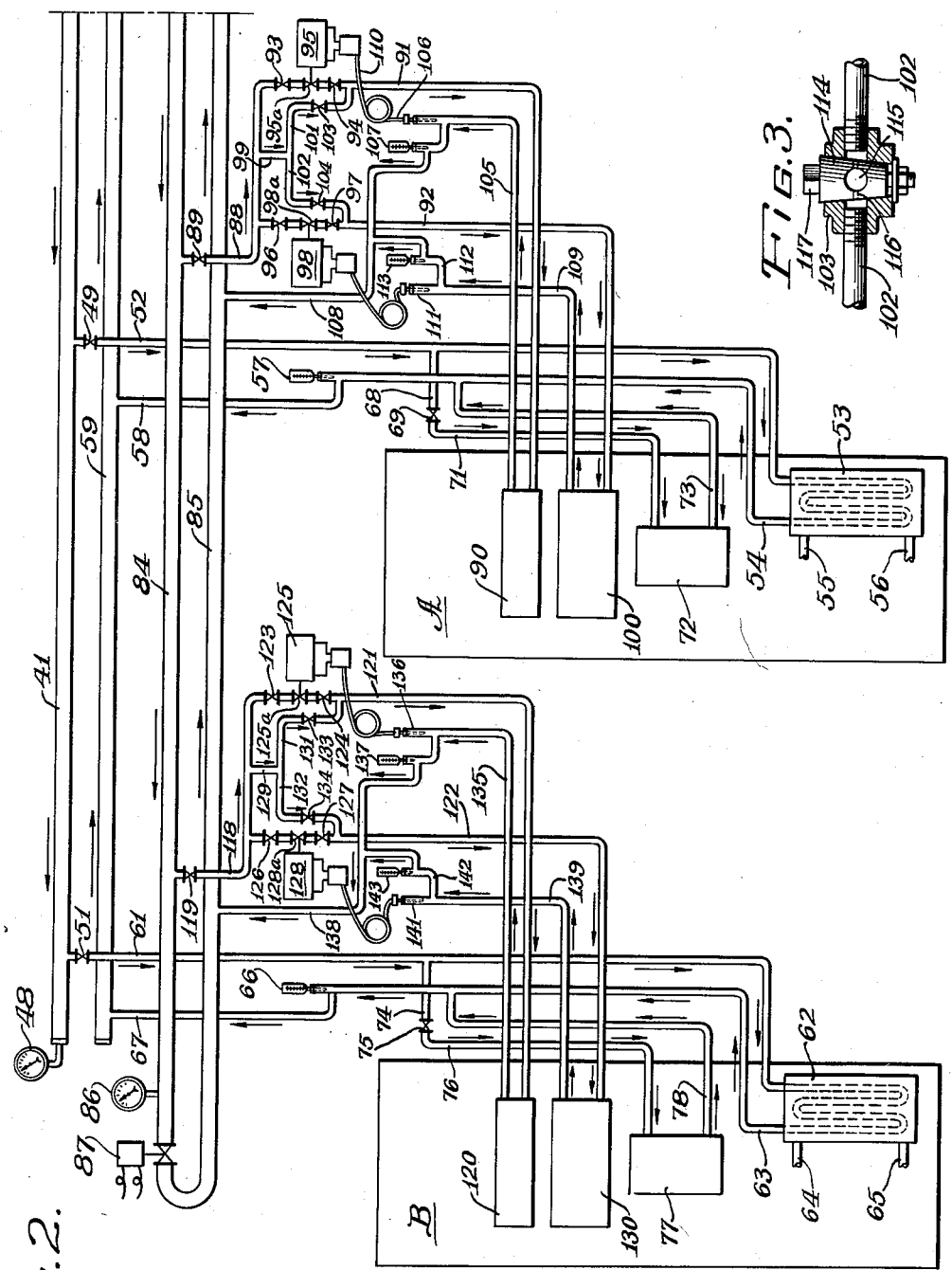

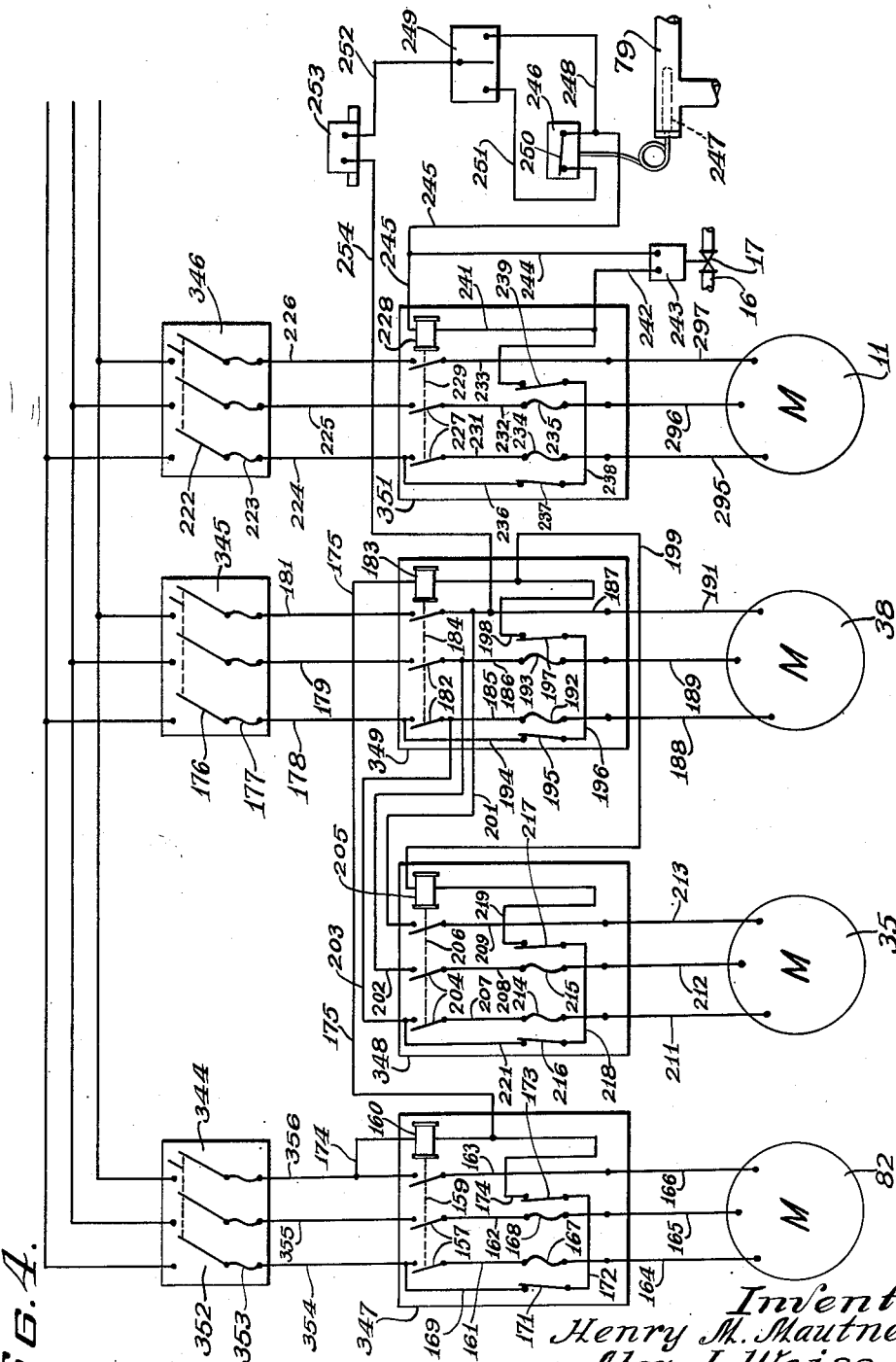

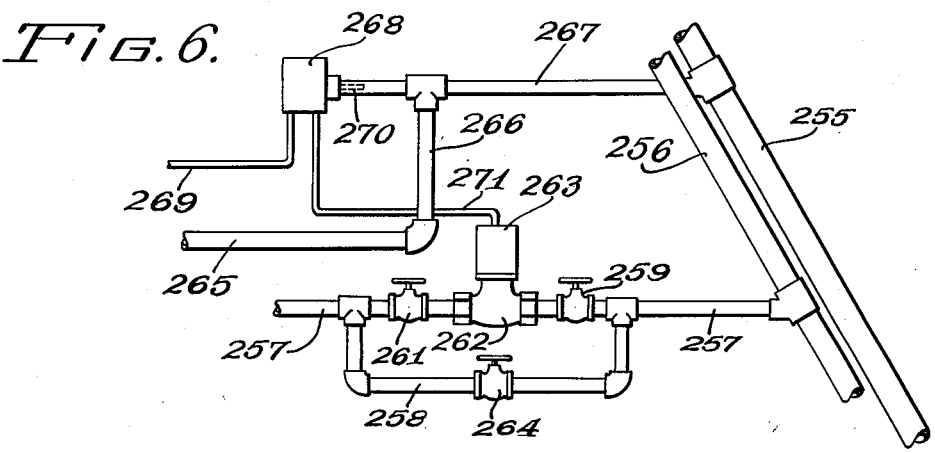
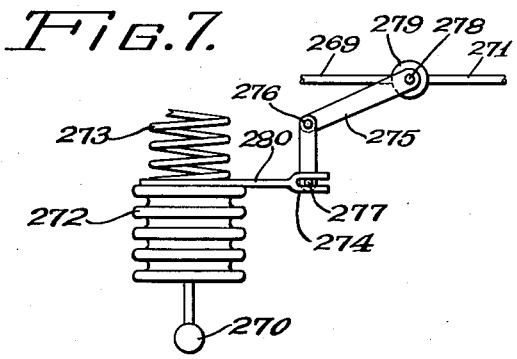
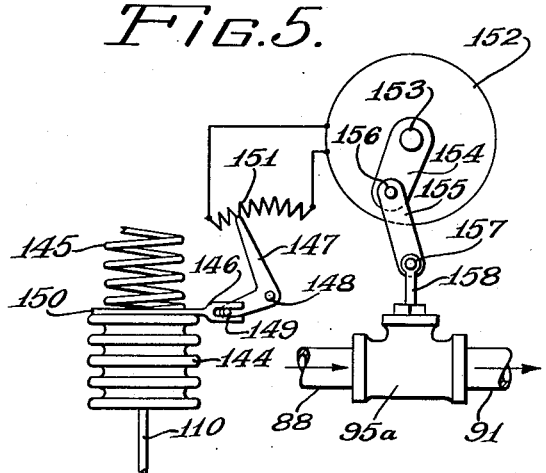
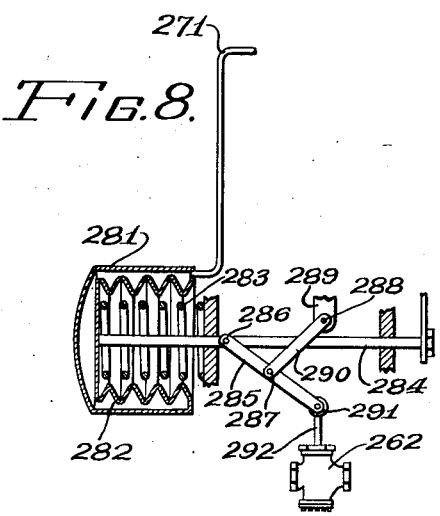

Patented Dec. 9, 1952

2,620,635

UNITED STATES PATENT OFFICE 2,620,635

COOLING SYSTEM AND CONTROL

Henry M. Mautner and Alex J. Weiss, Chicago, Ill., assignors to Erwin W. Mautner and Paul R. Unger, doing business as Mid-West Heat Service, Chicago, Ill.

Application September 9, 1950, Serial No. 184,034

18 Claims. (Cl. 62—4)

This invention relates to a cooling system and control therefor, and particularly to a cooling system and control for cooling a fluid, such as water or some eutectic material. The invention has particular application to cooling parts of plastic injection molding machines, although it is not limited thereto.

It is an object of the invention to provide an improved cooling system for fluids which is economical to operate and which maintains a substantially constant temperature of the parts to be cooled.

It is also an object of the invention to provide a novel control for a cooling system to maintain the necessary and safe flow of liquid and to properly control the temperature of the liquid.

It is an additional object of the invention to provide increased efficiency and productivity of injection molding machines for plastics.

It is a further object of the invention to provide an improved circulating path for the liquid to be cooled in a cooling system.

It is also an object of the invention to provide an improved cooling system for the mold body of a plastic molding machine as well as the lubricating fluid used in such machines.

It is a further object of the invention to provide for either electrical or pneumatic control for a cooling system.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

Figures 1 and 2 combined are a complete diagrammatic showing of the refrigeration system, the water piping and the control elements for a cooling system for various parts of a machine for manufacturing plastic articles by the injection molding method;

Figure 3 is a detail view of a by-pass valve, with parts thereof shown in section;

Figure 4 is a schematic wiring diagram of the electrical control for the system shown in Figures 1 and 2;

Figure 5 is a diagrammatic view of an electrical temperature control used in the system of Figures 1 and 2;

Figure 6 is a diagrammatic showing of a portion of a cooling system similar to that shown in Figures 1 and 2, in which pneumatic temperature control devices are utilized;

Figure 7 is a diagrammatic view of a portion of the pneumatic temperature control shown in Figure 6; and Figure 8 is a diagrammatic view of another portion of the pneumatic temperature control shown in Figure 6.

Figure 1:
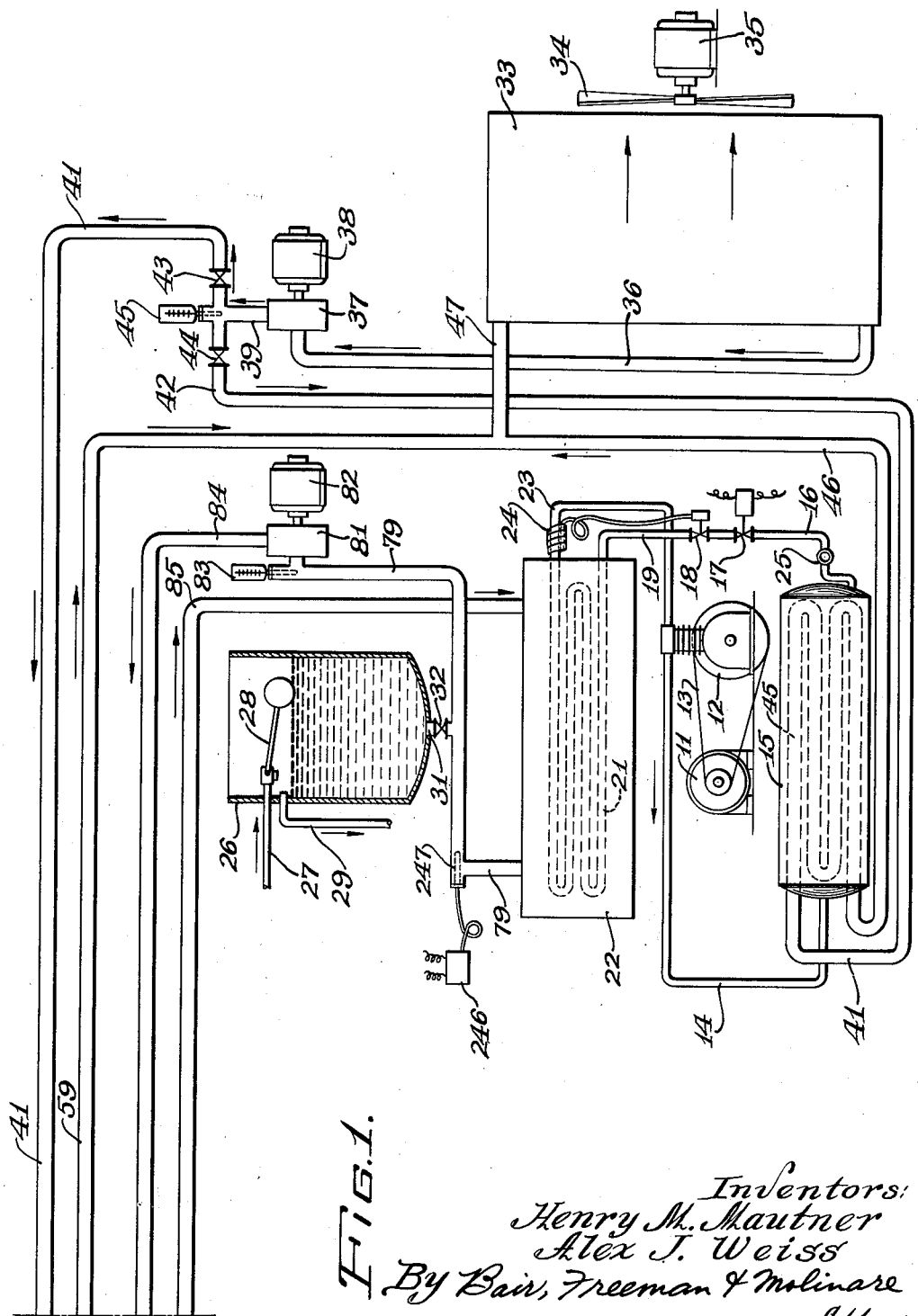

Referring specifically to Figure 1, the refrigeration system will first be described and it is pointed out that the refrigeration system is of standard construction. It comprises a motor 11 which drives a compressor 12 by means of a belt 13. The compressor pumps refrigerant such as, for example, "Freon," which enters through a discharge conduit 14 into a condenser shell 15, wherein the refrigerant is condensed in the well-known manner by means of cooling water, which will be described hereinafter. Liquid refrigerant from the condenser 15 passes through a conduit 16 into an inlet conduit 19 of an evaporator coil 21 which is contained within a water chiller 22. A safety solenoid shut off valve 17 and a standard expansion valve 18 are interposed between the conduits 16 and 19. A suction line 23 extends between the evaporator 21 and the inlet side of the compressor 12. A thermostatic element 24 is secured to the suction line 23 and controls the temperature of the evaporator 21 through the medium of the expansion valve 18. Preferably a sight gauge 25 is provided in the conduit 16 so that it may be determined whether or not liquid refrigerant is passing through that line.

Referring now to the water system and first to the portion thereof for providing make up water, a storage tank 26 is provided which is maintained normally filled with water. City water enters the tank 26 through a conduit 27 under the control of a float valve 28. An overflow pipe 29 is provided, as in the usual case. The storage tank 26 connects with the chilled water system through a conduit 31 having a valve 32 therein, which may be either automatically or manually controlled to add make up water to the system.

A cooling tower 33 of usual form is provided and associated therewith is a fan 34 which is driven by a cooling tower fan motor 35. The operation of the cooling tower in reducing the temperature of the water by evaporation thereof into the atmosphere is well known and no further description thereof is necessary.

Water which has been cooled in the cooling tower 33 is drawn upwardly through the conduit 36 by the action of a pump 37 driven by a cooling tower pump motor 38. The water then passes through a conduit 39 and is forced into branch conduits 41 and 42. Manual valves 43 and 44 are disposed in the conduits 41 and 42, respectively, so that the conduits may be isolated from the water supply in case repairs are necessary. Preferably, a thermometer 45 is placed at the junction of the conduits 41 and 42 so that the temperature of the water leaving the cooling tower may be noted.

The water passing through the conduit 42 is directed to a water cooling coil 45 within the condenser 15 and is returned to the top of the cooling tower 33 through conduits 46 and 47.

The water passing through the conduit 41, which is a supply conduit for certain parts of two injection molding machines A and B, shown diagrammatically in Figure 2, has conduits 52 and 61 connected thereto. Hand set control valves 49 and 51 are interposed in the conduits 52 and 61, respectively, to control the flow of water therethrough and, therefore, control the temperature of the parts to be cooled. A pressure gauge 48 is preferably placed in the supply conduit 41 adjacent the end thereof, as shown in Figure 2. The water passing through the conduit 52 from the cooling tower 33 passes through a heat exchanger 53 to cool the lubricating oil utilized in the injection molding machine A and is returned to a return conduit 59 through conduits 54 and 58. Oil is circulated to the heat exchanger through conduits 55 and 56. A thermometer 57 is preferably disposed in the conduit 54 so that the temperature of the water leaving the heat exchanger may be determined. The conduit 59 connects with the conduit 47 and water passing therethrough is delivered to the top of the cooling tower 33 for cooling therein and recirculation.

Water passing through the conduit 61 is likewise circulated to a heat exchanger 62 for cooling lubricating oil in machine B and the water is returned to the conduit 59 through conduits 63 and 67. The oil enters and leaves the heat exchanger 62 by means of conduits 64 and 65. A thermometer 66 is preferably disposed in the conduit 63, so that the temperature of the water leaving the heat exchanger 62 may be determined.

A branch conduit 68 is connected to the conduit 52 and has hand set valve 69 therein for controlling the flow of water. A conduit 71 extends from the valve 69 to a heat exchange element 72 of the injection molding machine A and is returned to conduit 59 through conduits 73 and 58.

Likewise, a branch conduit 74 is connected to conduit 61 and has a valve 75 therein for controlling the flow of water through a conduit 76 to a heat exchanger 77 of the other injection molding machine B. Water leaving the heat exchanger 77 is returned to the conduit 59 through conduits 78 and 67. The foregoing description is the complete water circulating system from the cooling tower 33.

Referring now to the circulating system from the water chiller 22, the water is pumped from the chiller through a conduit 79 by means of a pump 81 driven by a water cooler pump motor 82. A thermometer 83 is preferably placed in the line 79 to determine the temperature of the water being pumped from the water chiller 22. Water from the pump 81 is forced into a supply pipe 84 and is directed to the dies of the two injection molding machines shown in Figure 2. Water from conduit 84 to machine A is controlled partially by a hand set valve 89 and a conduit 88 which connects to the supply conduit 84. Cool water from the conduit 88 enters the conduit 91 under control of a thermostatically operated valve 95a having a thermostatic mechanism generally indicated at 95. Valves 93 and 94 are provided on each side of the thermostatically controlled valve 95a so that the valve 95a may be isolated and repaired or removed, from the system. Water from the conduit 88 also passes through a conduit 92 under control of a thermostat, generally indicated at 98. Valves 96 and 97 are disposed on both sides of the valve 98a so that the valve may be isolated, if desired. A by-pass line 99 is connected to branch by-pass conduits 101 and 102. By-pass valves 103 and 104 are disposed in the conduits 101 and 102, respectively. If it is necessary to isolate the thermostatically controlled valves 95a and 98a, the valves 93, 94, 96 and 97 may be closed and the by-pass valves 103 and 104 opened, so that the flow of water through conduits 91 and 92 may be controlled manually.

Chilled water from the conduit 91 cools a die shown generally at 90 of the injection molding machine A and is returned through conduits 105 and 108 to return conduit 85, which connects with the water chiller 22. A thermostatic element 106 is disposed in the end of the conduit 105 and controls the operation of the thermostatic valve controller 95.

Water from the conduit 92 enters the die 100 of injection molding machine A and is returned through conduits 109, 112 and 108, to return conduit 89. Thermostatic element 111 is disposed in the end of the conduit 109 and controls the thermostatic valve controller 98. A thermometer 113 is disposed in the conduit 112 to show the temperature of the water leaving the die 100, as is a similar thermometer 107 for determining the temperature of the water leaving the die 90.

The by-pass valve 103, for example, is arranged so that it never can be entirely shut off. It includes a valve plug 114 having a passage 115 therethrough for conveying water therethrough and is also provided with a very small diameter hole 116 therethrough which always permits a small amount of water to bleed through the by-pass valve 103, even though it is in the completely closed position. An adjusting nut 117 is secured to the valve plug 114 so that the position of the valve and the flow of water through conduit 102 may be regulated. The by-pass valve 104 and by-pass valves 133 and 134, to be described hereinafter, are constructed in the same manner as the valve 103, shown in Figure 3.

A conduit 118 is connected to the supply conduit 84, to supply chilled water to the other injection molding machine B, shown in Figure 2. A hand set valve 119 is disposed in the conduit 118 to control the flow of water therethrough. Water from conduit 118 is directed through conduits 121 and 122 which connect with dies 129 and 130, respectively, of the second injection molding machine. The conduit 121 is provided with shut-off valves 123 and 124 on opposite sides of a thermostatically controlled valve 125a, which is controlled by the thermostatic valve controller 125, in the same manner as set forth with respect to the control system for the injection molding machine A. Similar valves 126, 127, and 128a are interposed in the conduit 122 and the valve 128a is under control of a thermostatic valve controller 128. Also, a by-pass system is provided by a conduit 129 connecting to conduit 118 and opening into branch conduits 131 and 132 having by-pass valves 133 and 134, respectively, therein. The conduits 131 and 132 connect with conduits 121 and 122, respectively, in the same manner that conduits 101 and 102 connect with conduits 91 and 92, respectively, in injection molding machine A, first described.

Water from the die 120 is returned to the return conduit 84 through conduits 135 and 138. A thermostatic element 136 is disposed at the end of the conduit 135 and connects with the thermostatic valve controller 125 to operate the valve 125a and control the amount of water passing through the die 120 and, therefore, the temperature thereof. A thermometer 137 is preferably disposed at the end of the conduit 135, so that the temperature of the water leaving the die 120 may be determined.

Water leaving the die 130 passes through conduits 139, 142 and 138, which latter conduit connects with the return conduit 85. A thermostatic element 141 is disposed at the end of the conduit 139 and is connected to the thermostatic valve controller 128 to control the thermostatic valve 128a and thereby regulate the flow of cool water and regulate the temperature of the die 130. A thermometer 143 is disposed at the end of the conduit 142, so that the temperature of the water leaving the die 130 may be determined.

Referring specifically to Figure 5 of the drawings for a description of the temperature control for the valves 95a, 98a, 125a and 128a, the control consists of a bellows 144, which is connected by a suitable conduit 110 to the thermostatic element 106, which is disposed at the end of the conduit 105 and is subjected to the temperature of the water therein. A spring 145 opposes the bellows 144 and a separating member 150 is interposed between the bellows 144 and the spring 145 and is moved by changes in pressure in the bellows 144, which bellows is filled with gas or a liquid, in a manner well known in the art, as is the conduit 110 and thermostatic element 106. The movable member 150 has a forked end 156 which is adapted to engage with and move a bell crank lever 147 which is pivoted at 148 and has a pin 149 at one end thereof which is adapted to slide in the forked member 146. The other end of the bell crank lever is provided with a conduit which slides over a potentiometer, generally indicated at 151. The temperature control just described is standard equipment.

The modulating valve portion of the temperature control consists of a motor 152, which is connected to the potentiometer 151 and is rotated slightly in one direction or the other depending upon the position of the bell crank lever 147 on the potentiometer 151, in a manner well understood in the art. The motor is provided with a shaft 153 which has a link 154 secured through it. Link 154 is connected with a second link 155 by means of a pivot pin 156. The other end of the link 155 is connected to a pivot pin 157 at the end of a valve stem 158 for valve 95a. Rotation of the motor 152 in response to temperature changes in the element 106 raises and lowers the valve stem 158 to control the flow of fluid through the conduits 88 and 91 for the die 90. As stated above, the thermostat valve controllers 98, 125 and 128, and the respective valves controlled thereby, are all the same as the thermostat valve controller 95 and its valve 95a.

Referring specifically to Figure 4 for a detailed description of the wiring diagram shown therein, for control of the compressor motor 11, cooling tower pump motor 38, cooling tower fan motor 35 and water cooling pump motor 82, a three phase system is shown and the power supply is marked phase 1, 2 and 3, respectively. There are three manually operated line switches 344, 345 and 346 which are connected to the three phase power supply. Also connected to the motors 82, 35, 38, and 11, respectively, are electrical controllers, generally indicated by the numerals 347, 348, 349 and 351, which will be described in detail hereinafter.

The line switch 345 includes a three blade, single throw switch element 352, one blade being for each of the three phases. Fuses 353 are included in each of the three phases and conductors 354, 355 and 356 connect the line switch 344 with the first controller 347.

The controller 347 comprises three normally open switches 157, which are connected together with a single element, diagrammatically indicated at 159, which element is operated by a solenoid 160, in a manner hereinafter described. Conductors 161, 162 and 163 are connected to the lower end of the switches 157 and when the switches 157 are closed, current flows from phase 1 through conductors 161 and 354, from phase 2 through conductors 162 and 355 and from phase 3 through conductors 163 and 356. Conductors 164, 165 and 166 connect the three phases to the motor 82. Thermal elements 167 and 168 are interposed between conductors 161 and 164 and conductors 162 and 165, respectively. The thermal elements 167 and 168 are adapted to open switches, diagrammatically indicated at 171 and 173, in case the elements 167 and 168 reach a predetermined temperature due to overload. The switch 171 is connected into the circuit through a conductor 169, which is connected to conductor 354, and through a conductor 172, through normally closed switch 173 and conductor 174, which in turn connects to phase 3 through conductor 356. The solenoid 160, which may be termed a holding relay, is interposed in the conductor 174. A conductor 175 is connected to the conductor 174 between the normally closed switch 173 and the solenoid 160. The conductor 175 connects with a holding relay 183 which is a part of controller 349, for a purpose hereinafter described.

The second manually operated switch 345 includes three single throw switch blades 176, and fuses 177 for each of the phases. In a manner similar to that described with respect to the first motor 82, conductors 178, 179 and 181 connect the line switch 345 to the controller 349. Normally opened switches 182, which are connected together by a member 184, are disposed between conductors 178, 179 and 181 and conductors 185, 186 and 187, respectively. Energization of the holding relay or solenoid 183 closes the switches 182. The conductors 185, 186 and 187 are connected to conductors 188, 189 and 191 which lead to the motor 38. Thermal elements 192 and 193, similar to thermal elements 167 and 168, control normally closed switches 195 and 197, respectively. A conductor 194 is connected to conductor 178 and to one side of switch 195. A conductor 196 is connected to the other side of switch 195 and to one side of switch 197. A conductor 198 is connected to the other side of switch 197 and current passes therefrom through the solenoid 183 and conductor 175, solenoid 160, conductors 174 and 356, through line switch 344 to phase 3 of the power supply. Conductors 201, 202 and 203 connect conductors 187, 186 and 185, respectively, with one side of normally open switches 204 of controller 348. The switches 204 are connected together by a member diagrammatically shown at 206 which is operated by a holding relay or solenoid 205.

Conductors 207, 208 and 209 connect with the other side of switches 204. Conductors 211, 212 and 213 connect with the motor 35 to supply three phase power thereto. Conductors 207 and 211 are connected by means of a thermal element 214 and conductors 208 and 212 are connected by means of a thermal element 215. Conductors 209 and 213 are connected directly together. The thermal elements 214 and 215 are adapted to open normally closed switches 216 and 217 in the event of overload. A conductor 221 connects one side of the switch 216 to conductor 203 and a conductor 218 connects the other side of switch 216 to one side of switch 217. A conductor 219 connects the other side of switch 217 to holding relay 205.

The third line switch 246 includes three single throw switch blades 222, one for each of the phases of the power circuit. The switch blades are connected to conductors 224, 225 and 226 by individual fuses 223.

The motor controller 351 for motor 11 is similar in construction to the controller 347, 348 and 349. It includes switches 227, which are connected together by a member diagrammatically shown at 229, which is operated by a holding relay or solenoid 228. The conductors 224, 225 and 226 are connected to one side of the switches 227. Conductors 231, 232 and 233 are connected to the other side of switches 227. Conductors 295, 296 and 297 supply three phase current to compressor motor 11. Conductor 231 is connected to conductor 295 through a thermal element 234 and conductor 232 is connected to conductor 296 through a thermal element 235. Conductors 233 and 297 are directly connected together. The thermal elements 234 and 235 are adapted to open normally closed switches 237 and 239 in the event of overload. A conductor 236 connects one side of switch 237 to conductor 224. A conductor 238 connects the other side of switch 237 to one side of switch 239. A conductor 242 connects the other side of switch 239 to one side of solenoid valve 243, which valve is disposed in the refrigerant line 16 leading from the condenser 15. A conductor 241 connects one side of the holding relay 228 to conductor 242. The other side of the solenoid valve 243 is connected by a conductor 244 to a conductor 245, which conductor 245 connects to the other side of the holding relay 228.

Conductor 245 is also connected to one side of an immersion aquastat control 246. A thermal element 247 is disposed in the conduit 79 which is the conduit carrying cold water from the chiller 22. The thermal element 247 is designed to open and close a switch 250 which is part of the aquastat 246 to control operation of the compressor motor 11, as will become apparent as the description proceeds.

The other side of the aquastat 246 is connected to one side of a manual-automatic switch 249. Another thermal element of switch 249 is connected to the other side of switch 250 of aquastat 246 by a conductor 251. The manual-automatic switch 249 is of standard construction and as is well known in the art, in one position the automatic circuit is effective to control the compressor motor 11 whereas in the other position the compressor motor 11 may be operated by manual control. The switch 249 has another thermal element thereof connected to a common high-low safety pressure control 253. The other side of the pressure control 253 is connected to conductor 187 of motor controller 349 through conductor 254.

Operation of Figures 1 to 5, inclusive

The operation of the system described above is as follows: Assuming that the system has an adequate water supply and that the manual-automatic switch 249 is in the automatic position and line switches 344, 345 and 346 are closed, the following operations will take place. As is apparent, the water cooler pump motor 82, the cooling tower fan motor 35, and the cooling tower pump motor 38 will all be energized directly from the three phase source of power because as soon as the line switches are closed the holding relays 160, 205, 183, and 228 are energized, to close the switches 157, 204, 182, and 227.

Assuming that there is a demand for cooling the water in the water chiller 22, the aquastat 246 will have its switch 250 closed in order to energize the compressor motor 11. Solenoid valve 17 in the refrigerant line 16 will also be energized to open the line and permit the flow of refrigerant from the condenser 15.

As stated above, the refrigeration cycle is standard and refrigerant compressed by the compressor 12 is condensed in condenser 15 and the flow of refrigerant to the evaporator coils 21 of water chiller 22 is effected by the thermostatic expansion valve 18, to maintain a constant temperature of refrigerant in the evaporator 21. When the demand for cooling ceases, it is obvious that the aquastat 246 will break the circuit to the compressor motor 11 and solenoid valve 17 will be deenergized to prevent further flow of refrigerant to the evaporator coils 21. Therefore, the temperature of the evaporator 21 is under control of the expansion valve and the temperature of the water leaving the water chiller 22 is under control of the aquastat 246. However, it will be apparent from the wiring diagram that cycling of the compressor has no effect on operation of the motors 35, 38 and 82 together with the fan 34, pump 37, and pump 81, respectively.

Water from the bottom of the cooling tower is directed to the condenser 15 and is circulated to the heat exchangers 53, 62, 72, and 77 through the piping system described above, the control being accomplished solely by the hand set valves 49 and 51 in the water conduits 52 and 61. By adjusting the valves 49 and 51, the approximate temperature in the aforesaid heat exchangers may be fairly closely controlled and it is unnecessary to have extremely close control of the temperature therein.

Water circulated by the pump 81 from the water chiller is directed to the dies 90 and 100 of injection molding machine A, and to the dies 120 and 130 of injection molding machine B under the control of the thermostatic temperature controller and modulating valves heretofore described, a typical temperature control and modulating valve being shown in Figure 5. The control of the temperature of the dies is, therefore, very closely maintained and this is extremely important in injection molding of plastic material in order to obtain the highest number of injections and with the least amount of wastage or spoiled articles.

In case of a very low demand for cooling water to the dies of the injection molding machine, the modulating valve 87 will open to by-pass water from the supply conduit 84 back to the return conduit 85.

As was pointed out heretofore, the by-pass valve, a typical one of which is shown at 103, may be utilized to control the flow of cooling water to the respective dies of the injection molding machines under manual control. However, it is impossible to completely shut off the by-pass valves 103 regardless of the setting of the thermostatically controlled valves, a typical one of which is shown at 95a, or the setting of the by-pass valve itself, a typical one of which is shown at 103, and some cool water will always be delivered to the dies of the injection molding machines so as to maintain a reduced temperature therein. The by-pass valves also assure that some water is being circulated from the supply conduit 84 through the dies and back to the water chiller 22.

Referring specifically to Figure 4, it is apparent that if the water cooler pump motor 82 stops for any reason the holding relay 160 will become deenergized and open switches 157. It will also be apparent that through the inter-locking surfaces the other holding relays 205, 183 and 228 will also be deenergized and will stop operation of the cooling fan motor 35, cooling tower pump motor 38 and compressor motor 11. However, if the compressor motor 11 alone stops for any reason and holding relay 228 is deenergized to open switch 227, the other three motors 35, 38 and 82 continue in operation.

It will also be apparent from the interlock circuits that if the cooling tower fan motor 35, or the cooling tower pump motor 38, stops for any reason, all four motors 11, 35, 38, and 82 will be deenergized because the holding relays 160, 183, 205 and 228 will all be deenergized.

The above circuits assure that the cooling tower pump and fan are operating and the water cooler pump motor is operating if the compressor motor 11 is to be energized. Therefore, the system cannot be damaged by freeze ups. The circuit also insures that the water cooler pump motor 82, the cooling tower fan motor 35 and the cooling tower pump motor 38 may all continue operation even through the compressor motor 11 is deenergized. This is necessary if the compressor motor is to cycle and also insures circulation of water to the refrigeration system and to the injection molding machines even though the water is not being cooled in the chiller 22.

*Description of Figures 6, 7 and 8*

Referring to Figures 6, 7 and 8, there is a diagrammatic showing of a portion of a system such as shown in Figures 1 and 2 and the temperature control for the water in the system. The system is exactly the same as that shown in Figures 1 and 2 and the wiring is the same as shown in Figure 4 except that in this embodiment of the invention the temperature control for the water to the dies 90 and 100 of injection molding machine A and the dies 120 and 130 of injection molding machine B are pneumatically controlled rather than being controlled electrically. The pneumatic control obviously requires a source of air under pressure not shown, which is connected to the control system shown in Figure 6 by a conduit 269. In Figure 6, the water leaving the dies is conveyed through conduit 255 and the water entering the dies is supplied through a conduit 256.

The conduit 257 connects to the inlet water conduit 256 at one end and connects at the other end with the dies of one of the injection molding machines described above. A by-pass conduit 258 connects across with conduit 257 and a by-pass valve 264, similar to the valve shown in Figure 3, is provided therein. A modulating valve 262 is interposed in the conduit 257 and has manual valves 259 and 261 on both sides thereof. A modulating valve mechanism 263 is provided for operating the valve 262.

Conduits 265, 266 and 267 connect the outlet of the dies with the outlet water conduit 255. A temperature responsive device 268 is provided at the end of the conduit 267 and is responsive to the temperature of the water contained therein. A thermostatic element 270 is inserted in the conduit 267 and transmits the temperature of the water therein to the mechanism 268. A conduit 271 is provided for conveying compressed air from the mechanism 268 to the modulating valve mechanism 263.

Referring specifically to Figures 7 and 8 for a detailed description of the temperature responsive mechanism 268, and the modulating valve mechanism 263, which are shown diagrammatically in those views, the temperature responsive member 270 in valve 267 is filled with a gas or liquid and communicates with a bellows 272 which is otherwise filled with the same gas or liquid. A spring 273 opposes the force of the fluid in the bellows 272. A member 280 is interposed between the spring 273 and the bellows 272 and is moved in response to changes in temperature and, therefore, pressure within the bellows 272. The member 280 is provided with a forked end 274 which engages with a bell crank lever 275 which is pivotally supported at 276. A pin 277 is provided on one end of the bell crank lever 275 and is adapted to slide in the forked end 274 of the member 280. A valve 278 is interposed in the compressed air line between the conduits 269 and 271. The valve may be of the throttling type and the lever arm 275 rotates a valve stem shown diagrammatically at 279 in order to regulate the pressure of the compressed air passing through the conduit 271 to the modulating valve mechanism 263.

As shown in Figure 8, the mechanism 263 comprises an outer casing 281 and an inner bellows 282 which is sealed to the chamber 281. The compressed air conduit 271 communicates with the chamber formed between the casing 281 and bellows 282. The pressure of the air, therefore, moves the bellows against the bias of spring 283. The bellows are connected to a shaft 284 which is in turn connected to a linkage 285 by a pivotal connection 286. A link 290 is pivotally connected to the lever 285 at 287 and to a fixed support 289 at 288. The lower end of the lever 285 is pivotally connected at 291 to a valve stem 292 of the modulating valve 262. Movement of the bellows 282 in response to pressure changes in line 271, therefore, reciprocates shaft 284 and raises or lowers the valve stem 292 through the linkage described in order to regulate the flow of fluid through the valve 262 to the dies of the injection molding machine.

*Operation of Figures 6, 7 and 8*

The operation of the system described in Figures 6, 7 and 8 is the same as described with respect to the first embodiment of the invention except that parts thereof are operated pneumatically and the operation thereof is clear from the description of Figures 6, 7 and 8.

From the foregoing, it will be apparent that some changes may be made in the construction and arrangement of the parts of our device without departing from the real spirit and purpose of our invention, and it is our intention to cover by our claims any modified forms of structure and use of mechanical equivalents which may be reasonably included within their scope without sacrificing any of the advantages thereof.

We claim as our invention:

1. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled, means responsive to a condition of the low pressure side of the refrigerating means for controlling operation of the refrigerant circulating means, and electrical control means for said pumps and for the refrigerant circulating means including switch means for stopping the refrigerant circulating means if either or both of said pumps stop.

2. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled, means responsive to a condition of the low pressure side of the refrigerating means for controlling operation of the refrigerant circulating means, and electrical control means for said pumps and for the refrigerant circulating means including switch means for stopping the refrigerant circulating means if either or both of said pumps stop, and for maintaining both pumps in operation if the refrigerant circulating means stops.

3. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a fan for the evaporative cooling means, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled and means responsive to a condition of the low pressure side of the refrigerating means for controlling operation of the refrigerant circulating means, an electrical control means for the pumps, the fan and the refrigerant circulating means, said control means including switch means for stopping the refrigerant circulating means if one or more of said pumps or the fan stops.

4. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a fan for the evaporative cooling means, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled and means responsive to a condition of the low pressure side of the refrigerating means for controlling operation of the refrigerant circulating means, an electrical control means for the pumps, the fan and the refrigerant circulating means, said control means including switch means for stopping the refrigerant circulating means if one or more of said pumps or the fan stops, and for maintaining both the pumps and the fan in operation if the refrigerant circulating means stops.

5. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled and means responsive to a condition of the low pressure side of the refrigerating means for controlling operation of the refrigerant circulating means, inlet and outlet conduits for conveying said liquid to and from said part of the machine to be cooled and relief valve means between the inlet and outlet conduits for insuring the flow of a minimum quantity of liquid therethrough.

6. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled and means responsive to a condition of the low pressure side of the refrigerating means, for controlling operation of the refrigerant circulating means, inlet and outlet conduits for conveying liquid to and from said part of the machine to be cooled and a thermostatically controlled valve between the inlet conduit and the part of the machine to be cooled.

7. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a pump for circulating said evaporatively cooled liquid to the condenser and back to the evaporative cooling means, a pump for delivering part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled and means responsive to a condition of the low pressure side of the refrigerating means for controlling operation of the refrigerant circulating means, inlet and outlet conduits for conveying liquid to and from said part of the machine to be cooled and a thermostatically controlled valve between the inlet conduit and the part of the machine to be cooled, said thermostatically controlled valve being responsive to the temperature of the liquid leaving the part of the machine to be cooled.

8. A system for cooling a machine by a circulating liquid, said system including a refrigerating means comprising an evaporator, a condenser, means for circulating a refrigerant through the condenser and the evaporator and means for controlling the flow of refrigerant between the condenser and the evaporator and dividing the refrigerating means into a high pressure side and a low pressure side, respectively, said system also including means for cooling the condenser by pumping a liquid in heat exchange relation therewith, evaporative means for cooling said liquid, a pump for circulating said evaporatively cooled liquid to the condenser and back to the evaporative cooling means, a pump for delivering a part of the liquid in the cooling system in heat exchange relation with the evaporator and with a part of the machine to be cooled and then back to the evaporator, thermostatic means responsive to the temperature of the liquid which is pumped in heat exchange relation with the evaporator for controlling the temperature of the part of the machine to be cooled and means responsive to a condition of the low pressure side of the refrigerating means for controlling operation of the refrigerant circulating means, inlet and outlet conduits for conveying liquid to and from said part of the machine to be cooled, a thermostatically controlled valve between the inlet conduit and the part of the machine to be cooled, a by-pass line around the thermostatically controlled valve, and a manually operative valve in the by-pass line, said manually operable valve being so constructed that slight flow of liquid therethrough is afforded at all times.

9. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to cool one part of the machine and then back to the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled and means responsive to a condition of the low pressure side of the refrigerating means for controlling operation of the refrigerant circulating means.

10. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to one part of the machine and then back to the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled, means responsive to a condition of the low pressure side of the refrigerating means for controlling operation of the refrigerant circulating means, and electrical control means for said pumps and said refrigerant circulating means including switch means for stopping the refrigerant circulating means if either or both of the pumps stop.

11. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to one part of the machine and then back to the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled, means responsive to a condition of the low pressure side of the refrigerating means for controlling operation of the refrigerant circulating means, and electrical control means for said pumps and said refrigerant circulating means including switch means for stopping the refrigerant circulating means if either or both of the pumps stop, and for maintaining both of said pumps in operation if the refrigerant circulating means stops.

12. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to one part of the machine and then back to the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled, means responsive to a condition of the low pressure side of the refrigerating means for controlling operation of the refrigerant circulating means, and a manual valve for controlling the flow of liquid to the first part of the machine to be cooled.

13. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to one part of the machine and then back to the evaporative cooling means, a fan associated with the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled and means responsive to a condition of the low pressure side of the refrigerating means for controlling operation of the refrigerant circulating means.

14. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to one part of the machine and then back to the evaporative cooling means, a fan associated with the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled, means responsive to a condition of the low pressure side of the refrigerating means for controlling operation of the refrigerant circulating means and electrical control means for the pumps, the fan, and the refrigerant circulating means, including switch means for stopping the refrigerant circulating means if either or both of the pumps or the fan stop.

15. A system for cooling a machine by liquid, which machine has first and second parts to be cooled, said system including refrigerating means, comprising an evaporator, a condenser, means for circulating a refrigerant through the condenser and the evaporator and means for controlling the flow of refrigerant between the condenser and the evaporator and for dividing the refrigerating means into a high pressure side and a low pressure side, respectively, said cooling system also including means for cooling the condenser by pumping a liquid in heat exchange relation therewith, and for cooling the first part of the machine by pumping said liquid in heat exchange relation therewith, evaporating means for cooling the aforementioned liquid, a pump for circulating said evaporatively cooled liquid to said condenser and to one part of the machine and then back to the evaporative cooling means, a fan associated with the evaporative cooling means, a pump for pumping another part of the liquid in the cooling system in heat exchange relation with the evaporator and with the second part of the machine to be cooled and then back to the evaporator, thermostatic means responsive to the temperature of the liquid which is pumped in heat exchange relation with the evaporator for controlling the temperature of the second part of the machine to be cooled, means responsive to a condition of the low pressure side of the refrigerating means for controlling operation of the refrigerant circulating means and electrical control means for the pumps, the fan, and the refrigerant circulating means, including switch means for stopping the refrigerant circulating means if either or both of the pumps or the fan stop and for maintaining both pumps and the fan in operation if the refrigerant circulating means stops.

16. A system for cooling a machine by circulating liquid, said system including a refrigerating means comprising an evaporator, a condenser, a pump for circulating a refrigerant through the condenser and the evaporator, a motor for driving the pump and means for controlling the flow of refrigerant between the condenser and the evaporator and dividing the refrigerating means into a high pressure side and low pressure side, respectively, said system also including means for cooling the condenser by circulating a liquid in heat exchange relation therewith, evaporative cooling means for said liquid, a pump for circulating said evaporatively cooled liquid to the condenser and back to the evaporative cooling means, a second motor for driving said pump, a pump for delivering part of the liquid in the cooling system in heat exchange relation with the evaporator and with a part of the machine to be cooled and then back to the evaporator, a third motor for driving the last mentioned pump, thermostatic means responsive to the temperature of the liquid which is pumped in heat exchange relation with the evaporator for controlling the temperature of the part of the machine to be cooled, means responsive to a condition of the low pressure side of the refrigerating means for controlling operation of the first motor and electrical control means for said first, second and third motors including switch means for stopping the first motor if either or both of said second and third motors stop and for maintaining both said second and third motors in operation if the first motor stops.

17. A system for cooling a machine by liquid, said system including a refrigerating means comprising an evaporator, a condenser, means for circulating a refrigerant through the condenser and the evaporator, a first motor for driving the refrigerant circulating means and means for controlling the flow of refrigerant between the condenser and the evaporator and dividing the refrigerating means into a high pressure side and a low pressure side, respectively, said system also including means for cooling the condenser by circulating a liquid in heat exchange relation therewith, evaporative means for cooling said liquid, a fan for the evaporative means, a second motor for driving the fan, a pump for circulating said evaporative cooled liquid to the condenser and back to the evaporative cooling means, a third motor for driving said pump, a second pump for delivering part of the liquid in the cooling system in heat exchange relation with the evaporator and with a part of the machine to be cooled and then back to the evaporator, a fourth motor for driving the second pump, thermostatic means responsive to the temperature of the liquid which is pumped in heat exchange relation with the evaporator for controlling the temperature of the part of the machine to be cooled and means responsive to a condition of the low pressure side of the refrigerating means for controlling operation of the first motor, an electrical control means for all four motors, said control means including switch means for stopping the operation of the first motor if one or more of the other motors stops, and for maintaining all of the other motors in operation if the first motor stops.

18. A system for cooling a machine by liquid, which machine has first and second parts to be cooled, said system including refrigerating means comprising an evaporator, a condenser, means for circulating a refrigerant through the condenser and the evaporator, a first motor for driving the refrigerant circulating means and means for controlling the flow of refrigerant between the condenser and the evaporator and for dividing the refrigerating means into a high pressure side and a low pressure side, respectively, said cooling system also including means for cooling the condenser by circulating a liquid in heat exchange relation therewith, evaporative means for cooling the aforementioned liquid, a pump for circulating said evaporatively cooled liquid to said condenser and to one part of the machine and then back to the evaporatively cooling means, a second motor for driving said pump, a second pump for pumping another part of the liquid in the cooling system in heat exchange relation with the evaporator and with the second part of the machine to be cooled and then back to the evaporator, a third motor for driving said second pump, thermostatic means responsive to the temperature of the liquid which is pumped in heat exchange relation with the evaporator and controlling the temperature of the second part of the machine to be cooled, means responsive to a condition of the lower pressure side of the refrigerating means for controlling operation of the first motor and electrical control means for said motors including switch means for stopping the first motor if either or both said second and third motors stop.

HENRY M. MAUTNER.
ALEX J. WEISS.

REFERENCES CITED

The following references are of record in the file of this patent:

UNITED STATES PATENTS

| Number | Name | Date |
|---|---|---|
| 2,166,158 | Kalischer | July 18, 1939 |
| 2,264,385 | Knox | Dec. 2, 1941 |
| 2,357,706 | Toepperwein | Sept. 5, 1944 |
| 2,373,201 | Smith | Apr. 10, 1945 |
| 2,401,728 | Gillette | June 11, 1946 |
| 2,460,831 | Kovacs | Feb. 8, 1949 |
| 2,536,506 | Kleber | Jan. 2, 1951 |